United States Patent
Bito et al.

[11] Patent Number: 5,865,467
[45] Date of Patent: Feb. 2, 1999

[54] AIRBAG FOR FRONT SEAT PASSENGER

[75] Inventors: Kazuaki Bito; Takeshi Yamaji; Toru Ozaki, all of Osaka, Japan

[73] Assignee: Toyo Tire & Rubber Co., Ltd., Osaka, Japan

[21] Appl. No.: 952,456

[22] PCT Filed: Mar. 19, 1997

[86] PCT No.: PCT/JP97/00899

§ 371 Date: Dec. 2, 1997

§ 102(e) Date: Dec. 2, 1997

[87] PCT Pub. No.: WO97/36769

PCT Pub. Date: Oct. 9, 1997

[30] Foreign Application Priority Data

Apr. 1, 1996 [JP] Japan ................................. 8-104724

[51] Int. Cl.⁶ .................................................. B60R 21/16
[52] U.S. Cl. ..................................... 280/743.1; 280/728.1
[58] Field of Search .............................. 280/743.1, 728.1, 280/731, 732

[56] References Cited

U.S. PATENT DOCUMENTS

| | | | |
|---|---|---|---|
| 3,810,654 | 5/1974 | DeBano, Jr. et al. | 280/743.1 |
| 4,003,588 | 1/1977 | Oka et al. | 280/743.1 |
| 4,181,325 | 1/1980 | Barnett | 280/739 |
| 4,988,118 | 1/1991 | Good et al. | 280/743.1 |
| 5,022,675 | 6/1991 | Zelenak, Jr. et al. | 280/743.1 |
| 5,316,337 | 5/1994 | Yamaji et al. | 280/743.1 |
| 5,333,903 | 8/1994 | Eyrainer et al. | 280/743.1 |
| 5,454,594 | 10/1995 | Kricki | 280/743.1 |
| 5,782,488 | 7/1998 | Lewis et al. | 280/743.1 |

FOREIGN PATENT DOCUMENTS

| | | | |
|---|---|---|---|
| 2322629 | 11/1973 | Germany | 280/743.1 |
| 4-5145 | 1/1992 | Japan . | |
| 6-270756 | 9/1993 | Japan | 280/743.1 |
| 6-262991 | 9/1994 | Japan . | |
| 8-002364 | 1/1996 | Japan . | |

*Primary Examiner*—Christopher P. Ellis
*Attorney, Agent, or Firm*—Jordan and Hamburg

[57] ABSTRACT

In an airbag having a generally quadrilateral pyramidal body fallen sideways, cloths 21 and 22 for side face portions having a generally triangular shape constituting side face portions 20 of the pyramidal body, are extended from both side edge portions of an upper face portion 16 and a lower face portion 18 of the pyramidal body, opposed side edge portions 21a and 21a of the respective cloths 21 and 22 for the side face portions are sewed together, and both side edge portions 14a of a frontal portion 14 and respective side edge portions 21b and 22b of the cloths 21 and 22 for side face portions are sewed together, both the seam portions 24 in a lateral direction and the seam portions 26 in a vertical direction constituting a T-like shape fallen sideways formed at side face portions 20, are formed in a circular arc shape bent outwardly. Thereby, balance of extensions of the seam portions and other cloth portions of the airbag is achieved by which the airbag having a predetermined extended shape can easily be fabricated and further, stresses applied on intersections 28 of the seam portions 24 and the seam portions 26 can be alleviated.

4 Claims, 5 Drawing Sheets

AIRBAG FOR FRONT SEAT PASSENGER

TECHNICAL FIELD

The present invention relates to an airbag for an airbag device for a front seat passenger, particularly to an airbag for a front seat passenger next to a driver fabricated by sewing one-piece cloth.

BACKGROUND ART

An airbag device is a safety device as an auxiliary device for seat belt where an airbag is inflated instantaneously in a vehicular collision and which is normally constituted by an inflator that is a gas generator, an airbag for receiving and stopping a passenger that is inflated by gas released from the inflator and an airbag case for containing the inflator and the airbag.

The airbag has been developed not only for a driver's seat where the airbag is arranged at a steering wheel but also for a front seat next to the driver's seat where the airbag is arranged at an instrument panel or the like at a front portion in a vehicular compartment. Above all, an airbag sewed from one-piece cloth as the base cloth for airbag attracts attention owing to the merit of minimizing sewed portions or the like.

As such an airbag, there is proposed, for example, a one-piece airbag 100 as shown by FIG. 4 which has been proposed by the applicants in JP-A-05278544. The airbag 100 is provided with a generally quadrilateral pyramidal body fallen sideways which diverges from a lip portion 101 fixed to an opening of an airbag case (not shown) to a frontal face portion 102 for receiving and stopping a passenger in an inversely tapered shape in which cloths 106 for side face portions in generally triangular shape are integrally extended respectively from an upper face portion 103 and a lower face portion 104 of the airbag, longer sides of the cloths 106 are sewed each other and shorter sides thereof are sewed to side edge portions of the frontal face portion 102 whereby the side face portions 105 of the airbag are formed.

According to the conventional airbag 100, seam portions each in a T-like shape fallen sideways comprising a seam portion 107 in a lateral direction and a seam portion 108 in a vertical direction are formed at the side face portions 105. A seamless cloth portion and the seam portion differ in extending performance and therefore, it is not easy to fabricate an airbag having a predetermined extended shape.

Hence, it is a first object of the present invention to easily fabricate an airbag having a predetermined extended shape by providing predetermined slack to the seam portion.

Further, according to the conventional airbag 100, since the seamless cloth portion and the seam portion differ in extending performance, stresses applied on the vicinity of an intersection 109 for intersecting the seam portions 107 and 108 are not uniform in extending the airbag. With regard to the problem of the difference in extensions of the seamless cloth portion and the seam portion in the one-piece airbag, the applicants have proposed that in an airbag where seam portions in a Y-like shape fallen sideways are formed at side face portions of the airbag by sewing together individual sides of cloths for forming side face portions which are extended respectively from a frontal face portion, an upper face portion and a lower face portion of the airbag, by forming seam portions in the lateral direction in a circular arc shape, stresses applied on the seam portions in the lateral direction are alleviated (JP-A-06262991). Hence, it is conceivable that by applying the constitution to the above-described conventional airbag 100, as shown by FIG. 5, a bulge having a circular arc shape is provided to the seam portion 107 in the lateral direction in respect of the seam portion having a T-like shape fallen sideways in order to alleviate stresses applied on the intersection 109. However, even if the bulge in a circular arc shape is provided to the seam portion 107 in the lateral direction, a distance from the intersection 109 to the lip portion 101 of the bag, that is, the linear distance there-between remains unchanged and therefore, the problem of stress deviation at the vicinity of the intersection 109 is not resolved.

Hence, it is a second object of the present invention to alleviate stresses applied on such an intersection for intersecting the seam portion in the lateral direction and the seam portion in the vertical direction.

DISCLOSURE OF THE INVENTION

According to claim 1 of the present invention, there is provided an airbag for a front seat passenger having a generally quadrilateral pyramidal body fallen sideways diverging from a lip portion fixed to an opening of an airbag case to a frontal face portion for receiving and stopping a passenger in an inversely tapered shape and constituted by integrally extending cloths for side face portions having a generally triangular shape constituting the side face portions of the pyramidal body from respective both side edge portions of an upper face portion and a lower face portion of the pyramidal body, sewing together opposed side edge portions of the respective cloths for the side face portions and meanwhile, respectively sewing together respective side edge portions of the cloths for the side face portions opposed to the frontal face portion and both side edge portions of the frontal face portion, characterized in that the opposed side edge portions of the respective cloths for the side face portions are formed respectively in a circular arc shape bent outwardly and the both side edge portions of the frontal face portion and the side edge portions of the respective cloths for the side face portions sewed to the side edge portions of the frontal face portion are respectively formed in a circular arc shape bent outwardly.

According to the airbag, both of the seam portions in the lateral direction and the seam portions in the vertical directions are formed in a circular arc shape bent outwardly in the seam portions formed in a T-like shape fallen sideways and accordingly, slacks of cloths constituting a bow-like shape are formed at the respective seam portions. Accordingly, differences in extensions of the seam portions and seamless cloth portions can be absorbed by the slacks and as a result, the airbag having a predetermined extended shape can easily be fabricated. Further, by forming the seam portions in the vertical direction in a circular arc shape bent outwardly, intersections for intersecting the seam portions in the lateral direction and the seam portions in the vertical direction, are shifted from straight lines connecting upper ends and lower ends of the seam portions in the vertical direction to the passenger side and therefore, differences in extensions of the seam portions and the seamless cloth portions can be absorbed even at vicinities of the intersections. Thereby, stresses applied on the intersections in extending the airbag can be alleviated.

According to claim 2 of the present invention, there is provided an airbag for a front seat passenger having a generally quadrilateral pyramidal body fallen sideways diverging from a lip portion fixed to an opening of an airbag case to a frontal face portion for receiving and stopping a passenger in an inversely tapered shape and constituted by integrally extending cloths for side face portions having a generally triangular shape constituting the side face portions of the pyramidal body from respective both side edge portions of an upper face portion and a lower face portion of the pyramidal body, forming seam portions in a lateral direction by sewing together opposed side edge portions of the respective cloths for the side face portions and meanwhile, forming seam portions in a vertical direction by respectively sewing together respective side edge portions of the cloths for the side face portions opposed to the frontal face portion and both side edge portions of the frontal face portion, characterized in that each of the cloths for the side face portions is extended such that a distance from an apex thereof to the lip portion is prolonged by which an intersection for intersecting the seam portion in the lateral direction and the seam portion in the vertical direction is shifted from a straight line connecting an upper end and a lower end of the seam portion in the vertical direction to a side of the passenger.

In this way, in the cloths for side face portions having a generally triangular shape, by extending distances from apexes thereof to the lip portion of the bag, the intersections for intersecting the seam portions in the lateral direction and the seam portions in the vertical direction formed at side face portions of the pyramidal body, are shifted from the straight lines connecting upper ends and lower ends of the seam portions in the vertical direction to the passenger side by which differences in extensions of the seam portions and the seamless cloth portions can be absorbed at vicinities of the intersections and accordingly, stresses applied on the intersections in extending the airbag can be alleviated.

According to claim 3 of the present invention, there is provided the airbag for a front seat passenger according to claim 2, wherein each of the opposed side edge portions of the respective cloths for the side face portions, is formed in a circular arc shape bent outwardly.

Thereby, the seam portions in the lateral direction at the side face portions of the pyramidal body are formed in a circular arc shape bent outwardly and therefore, differences in extensions in respect of seamless cloth portions are absorbed in extending the airbag by which stresses applied on the seam portions can be alleviated.

According to claim 4 of the present invention, there is provided the airbag for a front seat passenger according to claim 3, wherein the both side edge portions of the frontal face portion and the side edge portions of the respective cloths for the side face portions sewed to the side edge portions of the frontal face portion are formed in a circular arc shape bent outwardly.

Thereby, the seam portions in the vertical direction at the side face portions of the airbag are also formed in a circular arc shape bent outwardly and therefore, slacks of cloth forming a bow-like shape are formed at both of the seam portions in the lateral direction and the vertical direction. Accordingly, differences in extensions of the seam portions and the seamless cloth portions can be absorbed by the slacks and as a result, the airbag having a predetermined extended shape can easily be fabricated. Further, formation of the seam portions in the vertical direction in a circular arc shape in such a way, is advantageous in adjusting enlargement of capacity of the airbag caused by providing the slacks on the side face portions of the airbag.

BEST MODE FOR CARRYING OUT THE INVENTION

An explanation will be given of embodiments of the present invention in reference to the drawings as follows.

Figure 1:
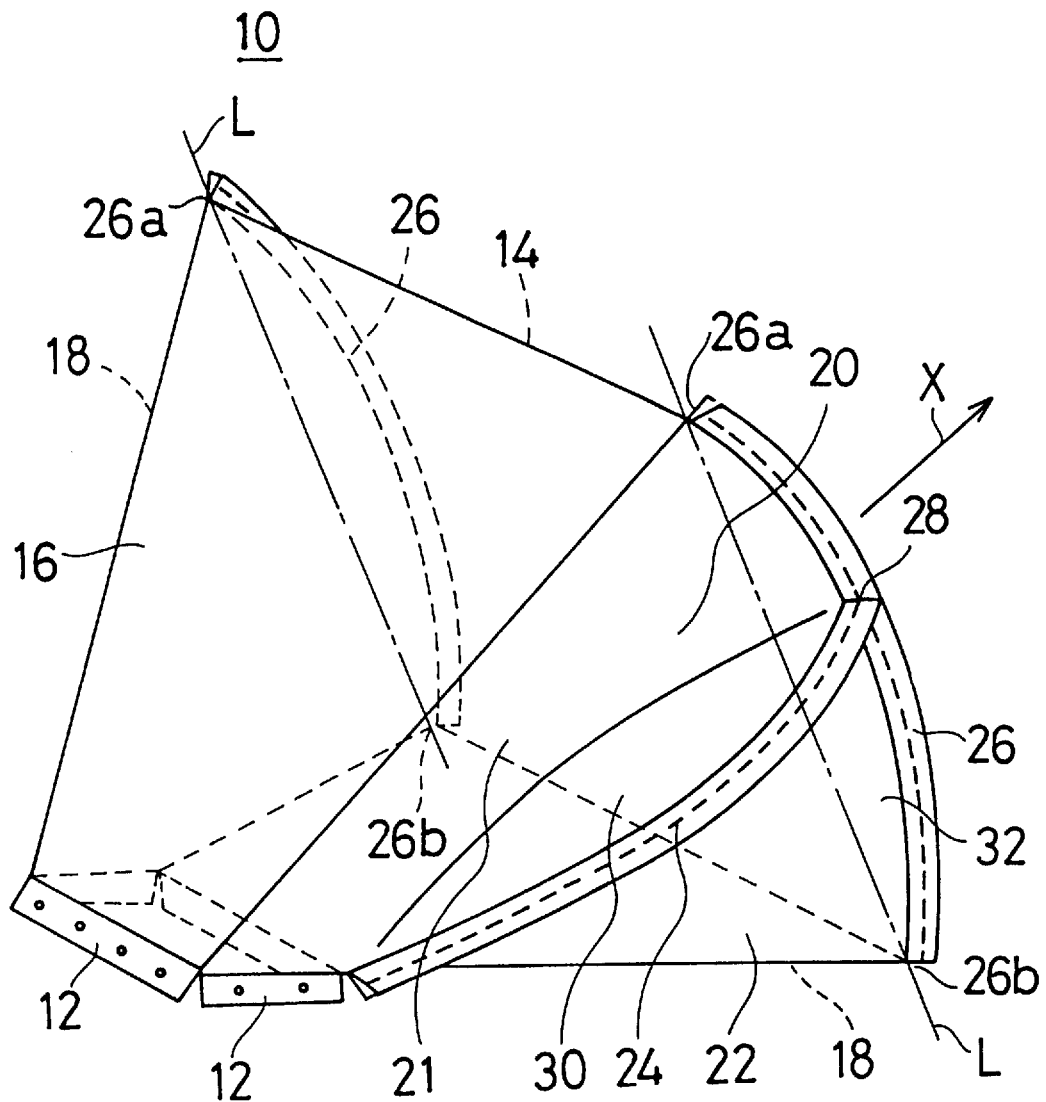
FIG. 1 is a perspective view showing an airbag 10 for a front seat passenger according to an embodiment of the present invention.
Figure 2:
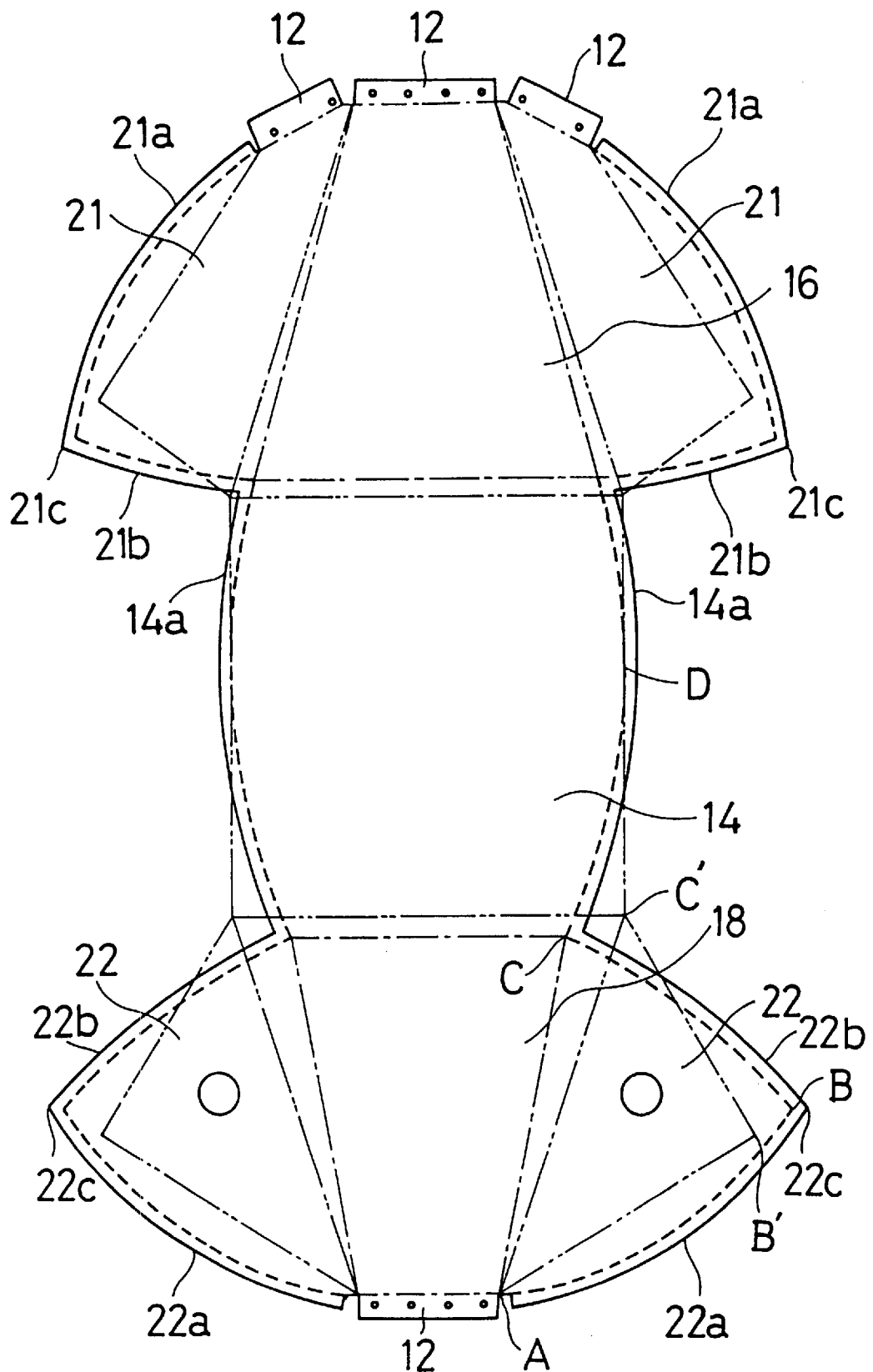
FIG. 2 is a plane view of a base cloth for forming the airbag 10.

FIG. 1 is a perspective view showing an airbag 10 for a front seat passenger according to an embodiment of the present invention and FIG. 2 is a development of an airbag showing a base cloth for forming the airbag 10 for a front seat passenger.

As shown by FIG. 1, the airbag 10 of the embodiment is provided with a generally quadrilateral pyramidal body fallen sideways diverging from lip portions 12 fixed to an opening of an airbag case (not shown) to a frontal face portion 14 having a generally rectangular shape for receiving and stopping a passenger in an inversely tapered shape.

Further, also as shown by FIG. 2, an upper face portion 16 and a lower face portion 18 both having a generally trapezoidal shape and respectively having the lip portions 12 at ends thereof, are integrally extended respectively from the upper and lower end portions of a frontal face portion 14. Cloths 21 and 22 for side face portions each having a generally triangular shape and constituting side face portions 20 of the pyramidal body, are integrally extended respectively from respective both side edge portions of the upper face portion 16 and the lower face portion 18, opposed side edge portions 21a and 22a of the respective cloths 21 and 22 for side face portions are sewed together and meanwhile, the side edge portions 21b and 22b opposed to the frontal face portion 14 and both side edge portions 14a of the frontal face portion 14 are respectively sewed together thereby constituting the basic structure.

Thereby, as shown by FIG. 1, seam portions each in a T-like shape fallen sideways constituted by intersecting at intersections 28 positioned at side edge portions of the frontal face portion 14, seam portions 24 extending in the lateral direction (direction X for extending airbag) constituted by sewing together the opposed side edge portions 21a and 22a of the cloths 21 and 22 for side face portions and seam portions 26 extending in the vertical direction (up and down direction of airbag) constituted by sewing together the side edge portions 21b and 22b of the cloths 21 and 22 for side face portions and the side edge portions 14a of the frontal face portion 14, are formed on the side face portions 20 of the airbag 10.

In the basic structure, according to the embodiment, the opposed side edge portions 21a and 22a of the respective cloths 21 and 22 for side face portions are respectively formed in a circular arc shape bent outwardly and the both side edge portions 14a of the frontal face portion 14 and the side edge portions 21b and 22b of the respective cloths 21 and 22 for side face portions sewed to the side edge portions 14a are respectively formed in a circular arc shape bent outwardly.

Thereby, in respect of the seam portions in a T-like shape fallen sideways formed at the side face portions 20 of the airbag 10, the seam portions 24 in the lateral direction and the seam portions 26 in the vertical direction are both formed in a circular arc shape bent outwardly by which slacks 30 and 32 of cloths having a predetermined bow-like shape are formed at the respective seam portions 24 and 26.

Further, by forming the seam portion 26 in the vertical direction in a circular arc shape bent outwardly, the intersection 28 is shifted from a straight line L connecting an upper end 26a and a lower end 26b of the seam portion 26 in the vertical direction to a passenger side, that is, toward a direction X for extending airbag. That is, the intersections 28 are arranged to dispose outside of a plane prescribed by the two straight lines L arranged at both of left and right sides of the airbag.

Here, an explanation will be given of the characterizing shape of the airbag 10 based on the shape of the base cloth for forming the airbag shown by FIGS. 2 and 3.

Figure 4:
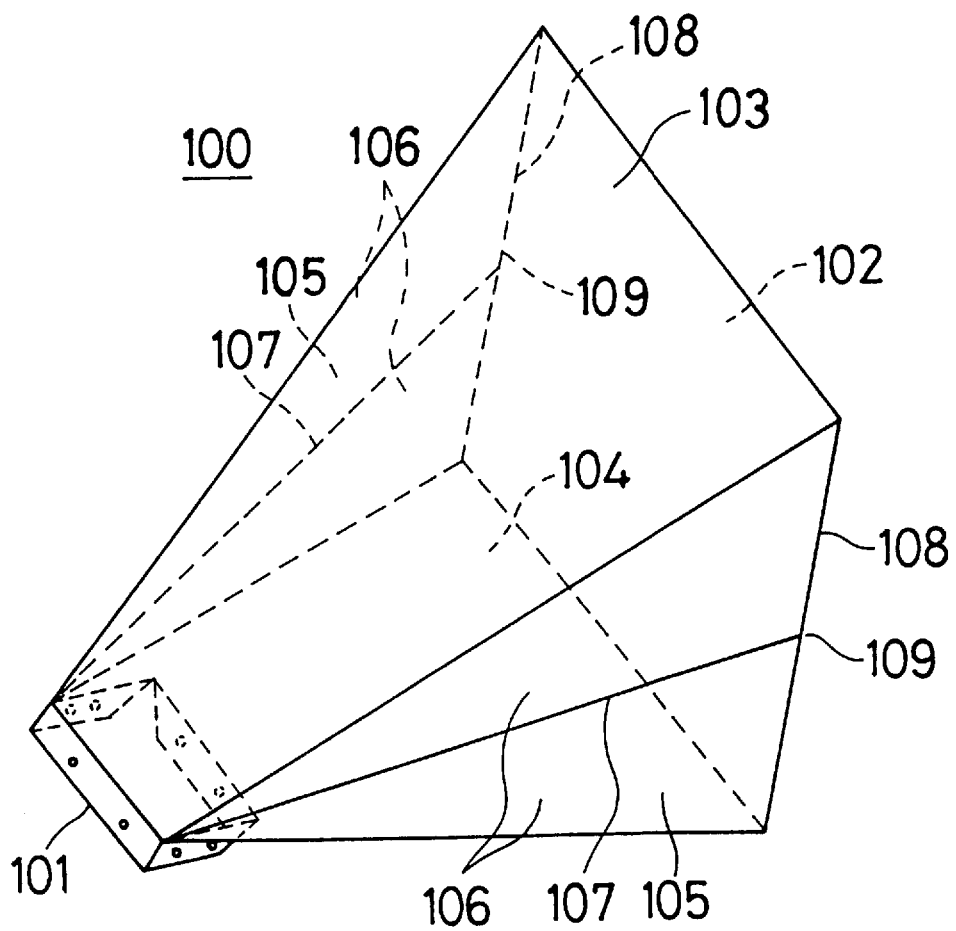
FIG. 4 is a perspective view showing a conventional airbag 100 for a front seat passenger.
Figure 5:
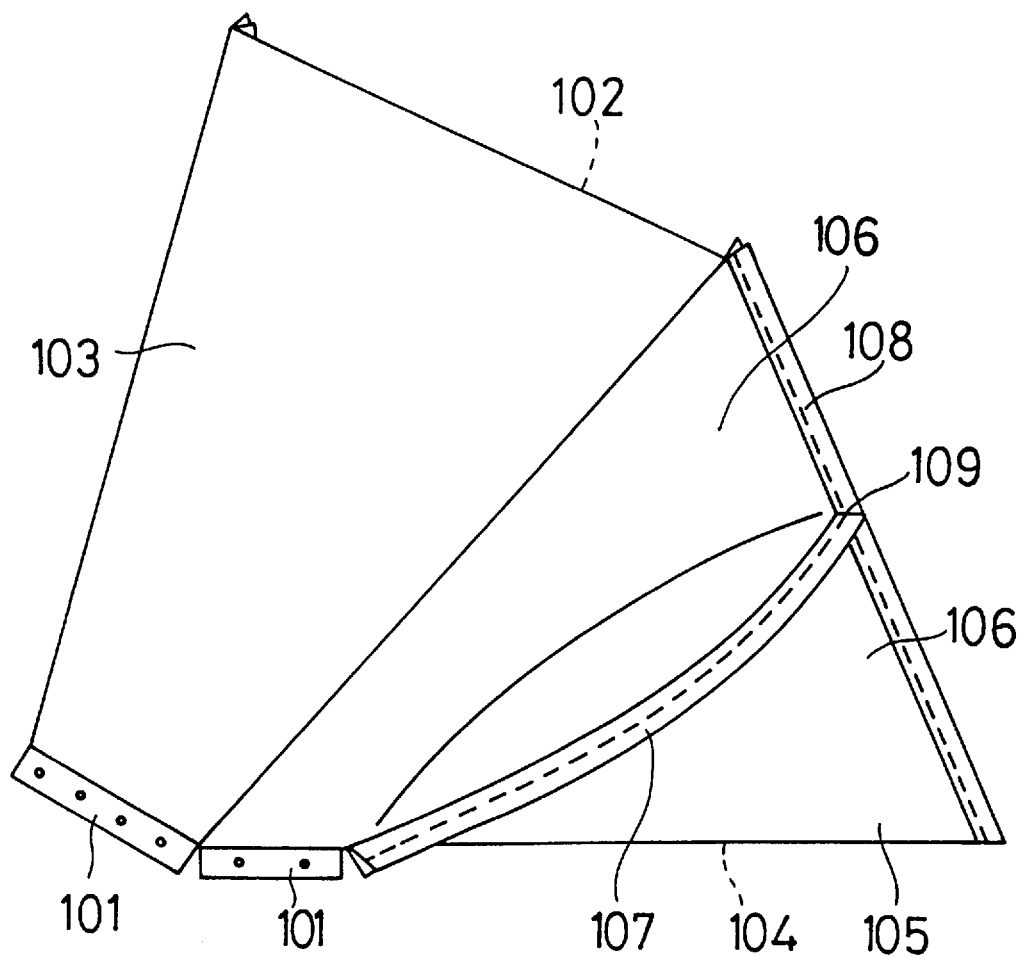
FIG. 5 is a perspective view showing an example of the airbag 100 for a front seat passenger in which a seam portion 107 in a lateral direction at a side face portion thereof is formed in a circular arc shape.

The shape of the airbag 10 is formed on the basis of a generally quadrilateral pyramidal body where the frontal face portion 14, the upper face portion 16, the lower face portion 18 and the both side face portions 20 are all constituted by a planar shape. In FIG. 2, the base cloth constituting the base shape is shown by two-dotted chain lines. Incidentally, the base shape corresponds to the shape of the conventional airbag 100 shown by FIG. 4.

Figure 3:
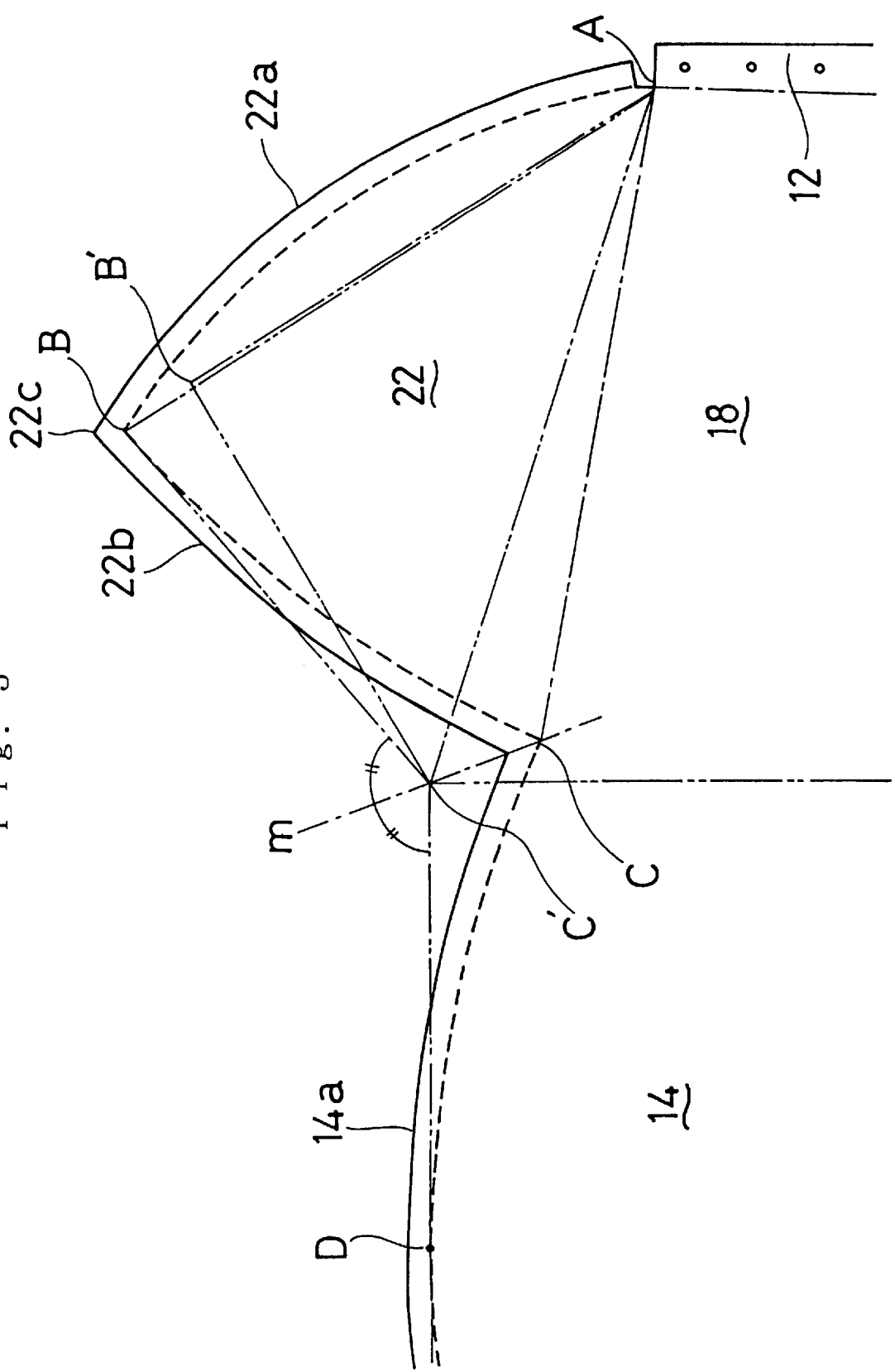
FIG. 3 is a partially magnifying plane view of the base cloth for forming the airbag 10.

As shown by FIG. 3, according to the airbag 10, the cloth 22 for side face portion is provided with a generally triangular shape prescribed by an arc AB, an arc BC and a line segment AC, the arc AB forms the seam portion 24 in the lateral direction by being sewed to the opposed side edge portion 21a of the cloth 21 for the side face portion and the arc BC forms substantially a half of the seam portion 26 in the vertical direction by being sewed to an arc DC.

Meanwhile, according to the base shape, the cloth for side face portion is constituted by the triangular shape prescribed by a right-angled triangle AB'C' (angle B'=90°) and DC' sewed to the line segment B'C' is also formed in a straight line. Here, point A is a point corresponding to an end portion of the cloth 22 for side face portion on the side of the lip portion 12, points B and B' are points corresponding to an apex 22C of the cloth 22 for side face portion, points C and C' are points corresponding to the lower end 26b of the seam portion 26 in the vertical direction and point D is a point disposed at the side edge portion of the frontal face portion 14 and a point for forming the intersection 28 for intersecting the seam portions 24 and 26 along with points B and B'.

In constituting the shape of the embodiment from the base shape, firstly, the triangle AB'C' is changed into the triangle ABC'. At that occasion, point B is determined such that the line segment AB becomes longer than the line segment AB' while maintaining the relationship of line element BC'=line element B'C'. Next, the line segment AB is changed into a circular arc AB bent outwardly. Further, the line segment BC' is changed into a circular arc BC. Here, point C is disposed on a straight line m equally dividing in two an angle made by the line segment BC' and the line segment C'D on the inner side of the straight line C'D. In the above operation, the radii of curvature of the arc AB and the arc BC and an extended portion of the line segment AB in respect of the line segment AB', can be set pertinently in accordance with differences in extensions of the seam portions 24 and 26 and seamless cloth portions and a desired shape of the airbag.

A solid shape as shown by FIG. 1 is constituted by sewing together the base cloth for forming the airbag having the above-described shape at the seam portions 24 and 26 and the airbag 10 is fabricated by turning inside out through the lip portion 12 from the state illustrated by FIG. 1.

By expansion in vehicular collision, the airbag 10 is brought into a state where the slacks 30 and 32 of the cloths having a bow-like shape formed by the seam portions 24 and 26 are stretched thereby constituting a predetermined extended shape.

According to the airbag 10 explained above, the seam portions 24 in the lateral direction and the seam portions 26 in the vertical direction constituting a T-like shape fallen sideways which are formed at the side face portions 20 of the airbag 10, are formed in a circular arc shape bent outwardly by which the predetermined slacks 30 and 32 of cloths are formed at the respective seam portions 24 and 26 and accordingly, the differences in extensions of the seam portions 24 and 26 and the seamless cloth portions can be absorbed by the slacks 30 and 32. That is, by providing the slacks 30 and 32 to the seam portions 24 and 26, the cloth area of the airbag 10 and the lengths of the seam portions 24 and 26 are conformed respectively to the cloth area of the curved surface of the solid and the lengths of the seam portions 24 and 26 in an expanded state. As a result, the airbag having the predetermined extended shape can easily be fabricated.

Further, by forming the seam portions 26 in the vertical direction in a circular arc shape bent outwardly, the intersections 28 for intersecting the seam portions 24 in the lateral direction and the seam portions 26 in the vertical direction, are shifted from the straight lines L connecting the upper ends 26a and the lower ends 26b of the seam portions 26 in the vertical direction to the passenger side and accordingly, the differences in extensions of the seam portions 24 and 26 and the seamless cloth portions can be absorbed also at vicinities of the intersections 28. Accordingly, stresses applied on the intersections 28 in extending the airbag can be alleviated. Further, the seam portions 24 and 26 have not necessarily to be bent in a circular arc shape but the intersections 28 may be arranged to shift from the straight lines L to the passenger side for only alleviating stresses applied on the intersections 28 for intersecting the seam portions 24 and 26.

Further, the seam portions 24 in the lateral direction extending in the direction X for extending the airbag 10, are formed in a circular arc shape bent outwardly and accordingly, stresses applied on the seam portions 24 in extending the airbag can be alleviated.

Further, the formation of the seam portions 26 in the vertical direction in a circular arc shape, is advantageous in reducing capacity of the airbag enlarged by providing the slacks 30 to the side face portions 20 of the airbag while maintaining a preferable deployment shape of the curved face.

Industrial Applicability

According to the airbag for a front seat passenger in respect of claim 1 of the present invention, slacks of cloth are formed at seam portions in a T-like shape fallen sideways which are formed on side face portions of the airbag and extensions of seamless cloth portions and the seam portions are balanced by the slacks and accordingly, a significant effect capable of easily fabricating the airbag having a predetermined extended shape is achieved.

According to the airbags for a front seat passenger described in claims 2 through 4, intersections for intersecting seam portions in the lateral direction and seam portions in the vertical direction formed at side face portions of the airbags, are shifted from straight lines connecting upper ends and lower ends of the seam portions in the vertical direction to the passenger side by which differences in extensions of the seam portions and the seamless cloth portions at vicinities of the intersections can be absorbed and accordingly, stresses applied on the intersections in extending the airbag can be alleviated.

We claim:

1. An airbag for a front seat passenger having a generally quadrilateral pyramidal body fallen sideways diverging from a lip portion fixed to an opening of an airbag case to a frontal face portion for receiving and stopping a passenger in an inversely tapered shape and constituted by integrally extending cloths for side face portions having a generally triangular shape constituting the side face portions of the pyramidal body from respective both side edge portions of an upper face portion and a lower face portion of the pyramidal body, sewn together opposed side edge portions of the respective cloths for the side face portions, and respectively sewn together respective side edge portions of the cloths for the side face portions opposed to the frontal face portion and both side edge portions of the frontal face portion, characterized in that:

the opposed side edge portions of the respective cloths for the side face portions are formed respectively in a circular arc shape bent outwardly and the both side edge portions of the frontal face portion and the side edge portions of the respective cloths for the side face portions sewed to the side edge portions of the frontal face portion are respectively formed in a circular arc shape bent outwardly.

2. An airbag for a front seat passenger having a generally quadrilateral pyramidal body fallen sideways diverging from a lip portion fixed to an opening of an airbag case to a frontal face portion for receiving and stopping a passenger in an inversely tapered shape and constituted by integrally extending cloths for side face portions having a generally triangular shape constituting the side face portions of the pyramidal body from respective both side edge portions of an upper face portion and a lower face portion of the pyramidal body, forming seam portions in a lateral direction by sewing together opposed side edge portions of the respective cloths for the side face portions, and forming seam portions in a vertical direction by respectively sewing together respective side edge portions of the cloths for the side face portions opposed to the frontal face portion and both side edge portions of the frontal face portion, characterized in that:

each of the cloths for the side face portions is extended such that a distance from an apex thereof to the lip portion is prolonged by which an intersection for intersecting the seam portion in the lateral direction and the seam portion in the vertical direction is shifted from a straight line connecting an upper end and a lower end of the seam portion in the vertical direction to a side of the passenger.

3. The airbag for a front seat passenger according to claim 2, wherein each of the opposed side edge portions of the respective cloths for the side face portions, is formed in a circular arc shape bent outwardly.

4. The airbag for a front seat passenger according to claim 3, wherein the both side edge portions of the frontal face portion and the side edge portions of the respective cloths for the side face portions sewed to the side edge portions of the frontal face portion are respectively formed in a circular arc shape outwardly.

\* \* \* \* \*